United States Patent
Du et al.

(10) Patent No.: US 9,343,951 B2
(45) Date of Patent: May 17, 2016

(54) HIGH-VOLTAGE PROTECTION CIRCUIT, HIGH-VOLTAGE PROTECTION METHOD AND POWER SUPPLY

(71) Applicant: ZTE Corporation, Shenzhen, Guangdong (CN)

(72) Inventors: Fengfu Du, Shenzhen (CN); Binchuan Dai, Shenzhen (CN); Jiang Wang, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 14/412,761

(22) PCT Filed: Jul. 29, 2013

(86) PCT No.: PCT/CN2013/080361
§ 371 (c)(1),
(2) Date: Jan. 5, 2015

(87) PCT Pub. No.: WO2013/167089
PCT Pub. Date: Nov. 14, 2013

(65) Prior Publication Data
US 2015/0146459 A1    May 28, 2015

(30) Foreign Application Priority Data

Oct. 31, 2012    (CN) .......................... 2012 1 0428821

(51) Int. Cl.
*H02H 7/10*    (2006.01)
*H02M 1/32*    (2007.01)
(Continued)

(52) U.S. Cl.
CPC . *H02M 1/32* (2013.01); *H02H 3/20* (2013.01); *H02H 9/04* (2013.01); *H02H 7/10* (2013.01)

(58) Field of Classification Search
CPC ............ H02M 1/32; H02M 2001/322; H02M 2001/325; H02M 5/00; H02M 5/40; H02M 5/45; H02M 5/4505; H02M 7/00; H02M 7/02; H02M 7/062; H02M 7/12; H02M 7/125; H02H 7/10; H02H 7/125; H02H 7/1252; H02H 7/1257; H02H 7/127
USPC ........ 363/50, 52, 53; 361/436, 91.1–91.8, 92, 361/18; 323/908; 307/43–87
See application file for complete search history.

(56) References Cited

U.S. PATENT DOCUMENTS 7,068,010 B2 *  6/2006  Youm ................. H02M 7/5387
                                                                  318/434
7,957,117 B2     6/2011  Divan
(Continued)

FOREIGN PATENT DOCUMENTS

CN    1553551 A        12/2004
CN    1728490 A    *    2/2006
(Continued)

OTHER PUBLICATIONS

International Search Report in international application No. PCT/CN2013/080361, mailed on Nov. 7, 2013.
(Continued)

*Primary Examiner* — Timothy J Dole
*Assistant Examiner* — Shahzeb K Ahmad
(74) *Attorney, Agent, or Firm* — Oppedahl Patent Law Firm LLC (57) ABSTRACT

Disclosed are a high-voltage protection circuit, a high-voltage protection method and a power supply. The high voltage protection circuit comprises a main relay, an auxiliary relay, a first resistor, a second resistor, a first capacitor and a second capacitor, wherein one end of the main relay is connected to the input port of a live line, and the other end thereof is connected to the output port of the live line; one end of the auxiliary relay is connected to the input port of the live line, and the other end thereof is connected between the first resistor and the second resistor; one end of the first capacitor is connected to the output port of the live line, and the other end thereof is connected to a neutral line parallel to the live line; the second capacitor is connected to both ends of the main relay in parallel; and the second resistor and the first resistor are connected between the input port and the output port of the live line in series in sequence. The present invention can effectively solve the problem that quick recovery cannot be achieved in an energy-saving mode, so that the system achieves high efficiency and energy saving, and can ensure high-voltage protection in an energy-saving mode through the bridge connection of the second capacitor to both ends of the main relay, and the adjustment of the capacitance values of the first capacitor and the second capacitor.

10 Claims, 3 Drawing Sheets

(51) Int. Cl.
*H02H 3/20* (2006.01)
*H02H 9/04* (2006.01)

(56) References Cited

U.S. PATENT DOCUMENTS

| | | | |
|---|---|---|---|
| 8,035,940 B2 * | 10/2011 | Lee | H02H 7/1213 |
| | | | 361/42 |
| 8,098,468 B2 * | 1/2012 | Zhu | H02H 7/1252 |
| | | | 361/91.1 |
| 8,325,455 B2 | 12/2012 | Divan | |
| 8,335,067 B2 | 12/2012 | Divan | |
| 8,335,068 B2 | 12/2012 | Divan | |
| 8,411,403 B2 | 4/2013 | Divan | |
| 8,593,776 B2 * | 11/2013 | Divan | H02H 3/207 |
| | | | 361/118 |
| 9,025,350 B2 * | 5/2015 | Gan | H02M 7/49 |
| | | | 361/18 |
| 2005/0029872 A1 * | 2/2005 | Ehrman | H02J 1/08 |
| | | | 307/11 |
| 2008/0247105 A1 | 10/2008 | Divan | |
| 2009/0152950 A1 | 6/2009 | Zhang | |
| 2010/0008117 A1 | 1/2010 | Luthi | |
| 2011/0205674 A1 | 8/2011 | Divan | |
| 2011/0205675 A1 | 8/2011 | Divan | |
| 2011/0205676 A1 | 8/2011 | Divan | |
| 2011/0216457 A1 | 9/2011 | Divan | |
| 2012/0163054 A1 | 6/2012 | Luthi | |

FOREIGN PATENT DOCUMENTS

| | | | |
|---|---|---|---|
| CN | 201134755 Y | * | 10/2008 |
| CN | 101615779 A | | 12/2009 |
| CN | 201937247 U | * | 8/2011 |
| CN | 202004633 U | * | 10/2011 |
| EP | 0981265 A1 | * | 2/2000 |

OTHER PUBLICATIONS

English Translation of the Written Opinion of the International Search Authority in international application No. PCT/CN2013/080361, mailed on Nov. 7, 2013.

Supplementary European Search Report in European application No. 13787199.2, mailed on Sep. 22, 2015.

* cited by examiner

Fig.1

—Prior Art—

Fig.2

—Prior Art—

Fig.3

—Prior Art—

HIGH-VOLTAGE PROTECTION CIRCUIT, HIGH-VOLTAGE PROTECTION METHOD AND POWER SUPPLY

TECHNICAL FIELD

The disclosure relates to the field of communication, in particular to a high-voltage protection circuit, a high-voltage protection method, and a power supply.

BACKGROUND

Figure 1:
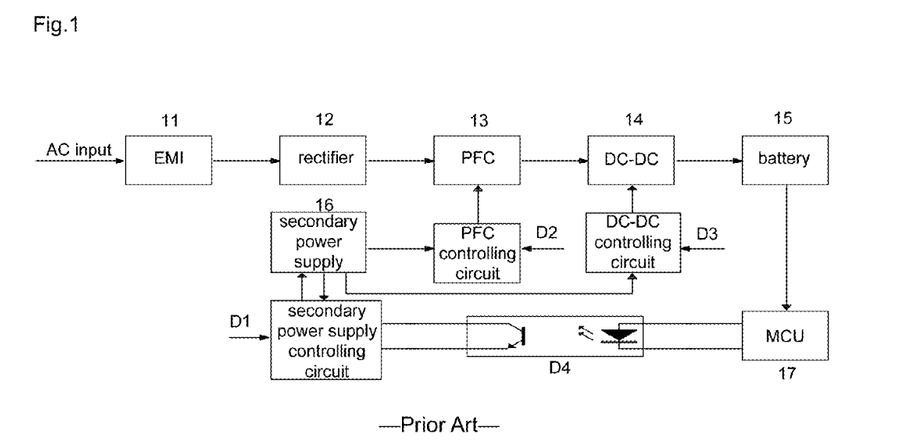
FIG. 1 is a logic diagram of a system with energy saving effect in related art.

At present, most communication power supplies adopt multiple rectifiers connected in parallel for load sharing. Efficiency characteristics of a rectifier may vary with a load. In general, efficiency for a light load may be low, and therefore some rectifiers have to be turned off to optimize system efficiency, such that system may have energy saving effect. In general, a battery may be hooked to an output of a system with multiple rectifiers connected in parallel. An existing efficient energy saving mode is as shown in FIG. 1. A system Micro Control Unit (MCU) controller 17 may be powered by a battery 15. The MCU controller 17 may make a logic decision according to a system load and a single-rectifier efficiency curve, and control some control pins of a secondary power supply 16 by optocoupler isolation, such that the secondary power supply idles. The secondary power supply 16 may serve to provide a DC stabilized voltage to a controlling circuit, a logic circuit, a fan circuit, or the like. Thus, by controlling the secondary power supply to stay idle, a rectifier in an energy saving state may be made to be merely hooked to an AC grid without drawing energy from the grid, thereby achieving better energy saving effect. In FIG. 1, EMI 11 may represent an Electro-Magnetic Interference filter, PFC 13 may represent a Power Factor Corrector.

A communication power supply adopts an AC input. When an AC input produces a long-term high voltage or when a neutral line in a Three-phase Power Supply System is disconnected, although there is no power output in overvoltage protection, an input circuit thereof is still connected to a grid. Without measure-taking at the power supply or the system, an output filtering electrolytic capacitor, generally 450V/470 µF, behind a rectifier bridge, will be damaged. The electrolytic capacitor may then burst, or even a fire at the power supply and a severe failure may be caused, leading to system communication interruption. Therefore, at present high-voltage protection is often implemented via protection at a power supply per se. High-voltage protection at a power supply may further include hiccup protection using a voltage-dividing resistor and hiccup protection via input cutoff with a relay.

Figure 2:
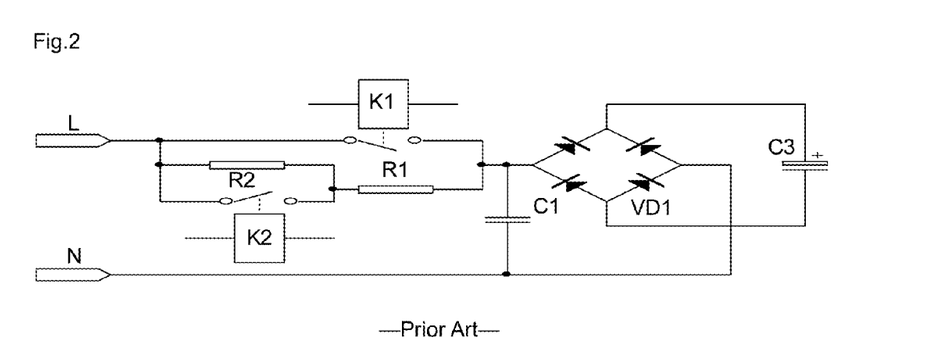
FIG. 2 is a schematic diagram of a circuit for high-voltage protection by voltage division in related art.

A circuit for hiccup protection using a voltage-dividing resistor, as shown in FIG. 2, basically operates as follows. When it is detected that everything is normal, regular relays K1, K2 are closed, in which case contact closure at a primary relay K1 leads to normal power output. When a voltage on an electrolytic capacitor C3 is detected to exceed a set value for high-voltage protection, a primary power circuit stops operating. At the same time the circuit is disconnected at regular relays K1, K2, in which case R2, R1 may be connected in series in the input circuit. Voltage-division may be implemented by impedance variability of R2, such that the voltage on the electrolytic capacitor C3 will not be overly high, implementing high-voltage protection. The R1 in general may be of a fixed resistance. The R2 in general may be a thermistor with a positive temperature coefficient. For a high-voltage protection by voltage division circuit, when an MCU controller issues an energy saving instruction to implement energy saving at a rectifier by controlling a secondary power supply to stop operating, the regular relays K1, K2 lose power rendering circuit disconnection at K1, K2, and R1, R2 are thus connected in series into the circuit. In this case, with a high grid voltage, a high distorted grid harmonic component, or a high environment temperature, R2 also will share a high voltage, thus a low voltage on the electrolytic capacitor C3. Now as the MCU controller issue a rebound-from-energy-saving instruction, the secondary power supply cannot operate right away, and therefore a rectifier cannot rebound right away from energy saving. In FIG. 2, L may represent a live line, N may represent a neutral line, and VD1 may represent a rectifier bridge.

Figure 3:
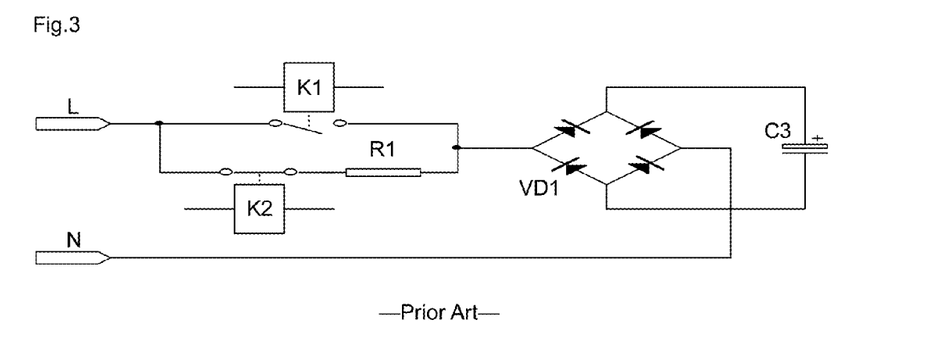
FIG. 3 is a schematic diagram of a circuit for high-voltage protection by circuit disconnection in related art.

A circuit for hiccup protection via input cutoff with a relay, as shown in FIG. 3, basically operates as follows. When it is detected that everything is normal, a regular relay K1 is closed. In high-voltage protection, the circuit is disconnected at the regular relay K1, an alternative relay K2 is closed. High-voltage protection is implemented by switching K2 with a voltage threshold of a control logic. A device for high-voltage protection by cutoff implements ultra-low standby power consumption by controlling a secondary power supply, during which reliable high-voltage protection may not be guaranteed in an abnormal grid, unless an additional secondary power supply powered by a system battery is provided, which may further complicates the circuit and raise a cost thereof.

SUMMARY

In view of this, an embodiment of the disclosure provides a high-voltage protection circuit, a high-voltage protection method, and a power supply, which, when a high-voltage protection device implements ultra-low standby power consumption by controlling a secondary power supply, can implement immediate rebound of a rectifier from energy saving once an MCU controller issues a rebound-from-energy-saving instruction, even with a high grid voltage, a high distorted grid harmonic component, or a high environment temperature in external environment.

According to an aspect of the disclosure, a high-voltage protection circuit includes a primary relay, a secondary relay, a first resistor, a second resistor, a first capacitor, and a second capacitor. One end of the primary relay is connected to an input port of a live line. The other end of the primary relay is connected to an output port of the live line. One end of the secondary relay is connected to the input port of the live line. The other end of the secondary relay is connected between the first resistor and the second resistor. One end of the first capacitor is connected to the output port of the live line. The other end of the first capacitor is connected to a neutral line connected in parallel with the live line. The second capacitor is connected in parallel with the primary relay. The second resistor and the first resistor are connected in series between the input port of the live line and the output port of the live line.

The first resistor may have a fixed resistance. The second resistor may be a thermistor.

The high-voltage protection circuit may further include a rectifier bridge and an electrolytic capacitor. An input end of the rectifier bridge may be connected to both ends of the first capacitor. The electrolytic capacitor may be connected to an output end of the rectifier bridge.

According to an aspect of the disclosure, a power supply includes the high-voltage protection circuit, a rectifier circuit, an electrolytic capacitor, a Direct Current (DC-DC) conversion circuit, a secondary power supply, an electrolytic capacitor voltage detecting circuit, a secondary relay controlling circuit, a primary relay controlling circuit, and an Alternating Current (AC) input voltage detecting circuit.

The high-voltage protection circuit may be configured for performing high-voltage protection on the power supply. The primary relay controlling circuit may be configured for opening and closing the primary relay in the high-voltage protection circuit. The secondary relay controlling circuit may be configured for opening and closing the secondary relay in the high-voltage protection circuit. The output end of the high-voltage protection circuit may be connected to an input end of the rectifier circuit. The electrolytic capacitor may be connected between an output end of the rectifier circuit and an input end of the DC-DC conversion circuit. An output end of the secondary power supply may be connected to a relay in the high-voltage protection circuit, the AC input voltage detecting circuit, the primary relay controlling circuit, the secondary relay controlling circuit, and the electrolytic capacitor voltage detecting circuit.

The power supply may further include a Micro Control Unit (MCU) controller, an optocoupler, and a secondary power supply controlling circuit. The MCU controller may be connected to the DC-DC conversion circuit. The optocoupler may be connected to the MCU controller. The secondary power supply controlling circuit may be connected between the secondary power supply and the optocoupler.

The power supply may further include a cell. Outputs of the DC-DC conversion circuit may be connected in parallel to the cell. The cell may serve as a load of the power supply. The cell may be configured for powering the MCU controller.

The MCU controller may be configured for, when a rectifier in the rectifier circuit may be in an energy saving mode, stopping the secondary power supply according to a Pulse Width Modulation (PWM) control signal for blocking the secondary power supply controlling circuit issued by the optocoupler.

According to an aspect of the disclosure, a high-voltage protection method in using the power supply includes: closing and opening the primary relay and the secondary relay in the high-voltage protection circuit according to an AC input voltage detecting signal output by the AC input voltage detecting circuit and an electrolytic capacitor voltage detecting signal output by the electrolytic capacitor voltage detecting circuit; and performing high-voltage protection on the power supply and performing energy saving control on one or more rectifiers in the power supply by opening and/or closing the primary relay and the secondary relay.

The closing and opening the primary relay and the secondary relay in the high-voltage protection circuit according to an AC input voltage detecting signal output by the AC input voltage detecting circuit and an electrolytic capacitor voltage detecting signal output by the electrolytic capacitor voltage detecting circuit may include: when the rectifier may be in a non-energy-saving mode, receiving and processing, by the AC input voltage detecting circuit, an AC input signal, and outputting the AC input voltage detecting signal to the primary relay controlling circuit; receiving and processing, by the electrolytic capacitor voltage detecting circuit, a voltage output signal of the electrolytic capacitor, and outputting the electrolytic capacitor voltage detecting signal to the primary relay controlling circuit and the secondary relay controlling circuit; and processing, by the primary relay controlling circuit and the secondary relay controlling circuit, the AC input voltage detecting signal and the electrolytic capacitor voltage detecting signal received, and generating a control signal for controlling the high-voltage protection circuit.

The processing, by the primary relay controlling circuit and the secondary relay controlling circuit, the AC input voltage detecting signal and the electrolytic capacitor voltage detecting signal received, and generating a control signal for controlling the high-voltage protection circuit may include: when normal voltages are detected according to both the AC input voltage detecting signal and the electrolytic capacitor voltage detecting signal, controlling, by the primary relay controlling circuit, the primary relay to stay closed, controlling, by the secondary relay controlling circuit, the secondary relay to stay closed, and implementing normal power output via the primary relay; when an AC current overvoltage is detected, controlling, by the primary relay controlling circuit, the primary relay to stay open, and controlling, by the secondary relay controlling circuit, the secondary relay to stay open.

The performing high-voltage protection on the power supply and performing energy saving control on one or more rectifiers in the power supply by opening and/or closing the primary relay and the secondary relay may include: performing high-voltage protection on the power supply by opening and/or closing the primary relay and the secondary relay, and performing energy saving control on one or more rectifiers in the power supply using the MCU controller.

In an embodiment herein, a second capacitor C2 is connected across both ends of the primary relay. With a high grid voltage, a high distorted grid harmonic component, or a high environment temperature in energy saving, due to parallel impedance of the second capacitor C2, rapid rebound from an energy saving mode may be implemented effectively by adjusting capacitance of the first capacitor C1 and the second capacitor C2, thereby implementing efficient system energy saving. In addition, due to voltage-division and suppression by the first resistor R1 and the second resistor R2, high-voltage protection in an energy saving mode may be ensured.

BRIEF DESCRIPTION OF THE DRAWINGS

A drawing illustrated herein is provided for further understanding of an embodiment of the disclosure, and forms a part of the disclosure. An illustrative embodiment of the disclosure and description thereof are for explaining the disclosure, and may not form improper limitations to the disclosure.

DETAILED DESCRIPTION

Note that the embodiments of the disclosure and features therein can be combined with each other as long as no conflict results from the combination. The present disclosure is elaborated below with reference to the drawings and specific embodiments.

Figure 4:
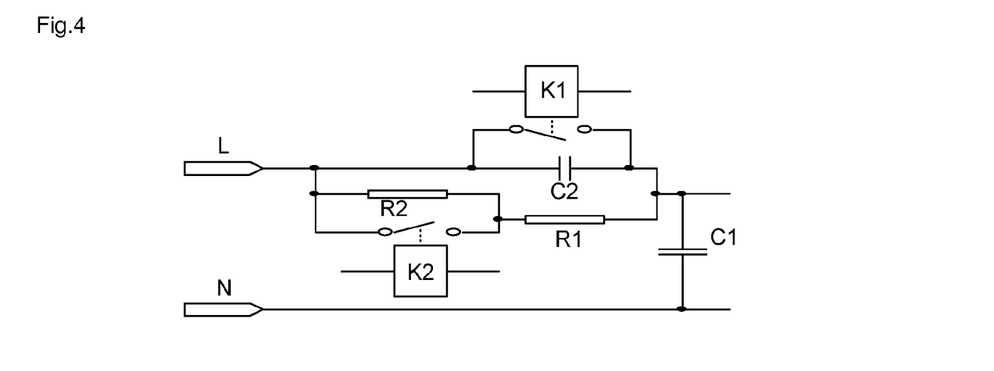
FIG. 4 is a schematic diagram of a high-voltage protection circuit according to an embodiment of the disclosure.

An embodiment of the disclosure provides a high-voltage protection circuit. FIG. 4 is a schematic diagram of a high-voltage protection circuit according to an embodiment of the disclosure. As shown in FIG. 4, the high-voltage protection circuit includes a primary relay K1, a secondary relay K2, a first resistor R1, a second resistor R2, a first capacitor C1, and a second capacitor C2.

One end of the primary relay K1 is connected to an input port of a live line. The other end of the primary relay K1 is connected to an output port of the live line. One end of the secondary relay K2 is connected to the input port of the live line. The other end of the secondary relay K2 is connected between the first resistor R1 and the second resistor R2. One end of the first capacitor C1 is connected to the output port of the live line. The other end of the first capacitor C1 is connected to a neutral line connected in parallel with the live line. The second capacitor C2 is connected in parallel with the primary relay K1 at both end of K1. The second resistor R2 and the first resistor R1 are connected in series between the input port of the live line and the output port of the live line.

In related art, when an existing high-voltage protection device implements ultra-low standby power consumption by controlling a secondary power supply, a rectifier cannot rebound from energy saving right away once an MCU controller issues a rebound-from-energy-saving instruction, due to a high grid voltage, a high distorted grid harmonic component, or a high environment temperature in external environment. In an embodiment herein, a second capacitor C2 is connected across both ends of the primary relay. With a high grid voltage, a high distorted grid harmonic component, or a high environment temperature in energy saving, due to parallel impedance of the second capacitor C2, rapid rebound from an energy saving mode may be implemented effectively by adjusting capacitance of the first capacitor C1 and the second capacitor C2, thereby implementing efficient system energy saving. In addition, due to voltage-division and suppression by the first resistor R1 and the second resistor R2, high-voltage protection in an energy saving mode may be ensured.

The first resistor R1 may have a fixed resistance. The second resistor R2 may be a thermistor. In an actual application, the second resistor R2 in general may be a thermistor with a positive temperature coefficient.

The high-voltage protection circuit may further include a rectifier bridge VD1 and an electrolytic capacitor C3. An input end of the rectifier bridge VD1 may be connected to both ends of the first capacitor C1. The electrolytic capacitor C3 may be connected to an output end of the rectifier bridge VD1. A voltage shared by the electrolytic capacitor C3 may be controlled in energy saving, thus enabling rapid system rebound from energy saving.

Figure 5:
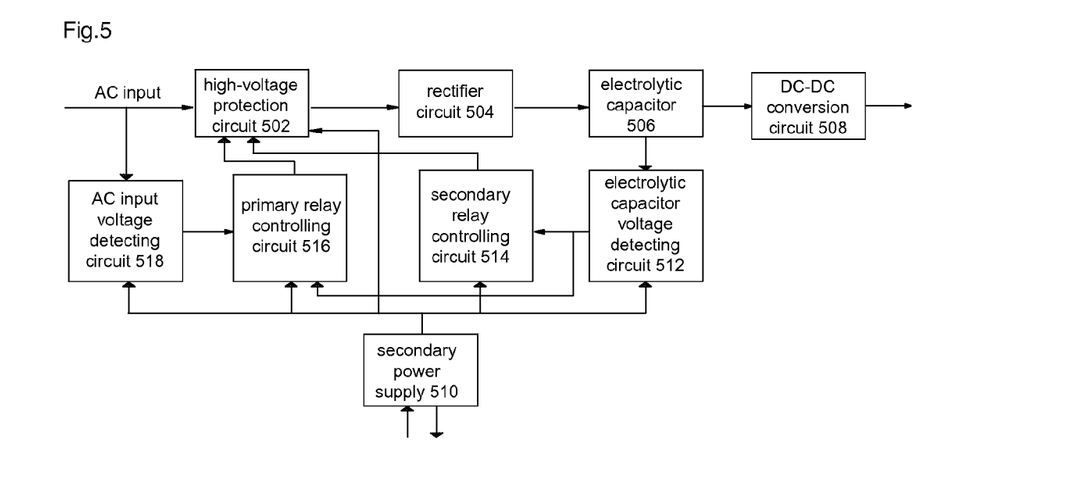
FIG. 5 is a schematic diagram of a structure of a power supply according to an embodiment of the disclosure.

An embodiment of the disclosure further provides a power supply. FIG. 5 is a schematic diagram of a structure of a power supply according to an embodiment of the disclosure. As shown in FIG. 5, the power supply includes an aforementioned high-voltage protection circuit 502, a rectifier circuit 504, an electrolytic capacitor 506, a Direct Current (DC-DC) conversion circuit 508, a secondary power supply 510, an electrolytic capacitor voltage detecting circuit 512, a secondary relay controlling circuit 514, a primary relay controlling circuit 516, and an Alternating Current (AC) input voltage detecting circuit 518.

The high-voltage protection circuit 502 is configured for performing high-voltage protection on the power supply.

The primary relay controlling circuit 516 is configured for opening and closing the primary relay in the high-voltage protection circuit 502.

The secondary relay controlling circuit 514 is configured for opening and closing the secondary relay in the high-voltage protection circuit 502.

The output end of the high-voltage protection circuit 502 is connected to an input end of the rectifier circuit 504. The electrolytic capacitor 506 is connected between an output end of the rectifier circuit 504 and an input end of the DC-DC conversion circuit 508.

An output end of the secondary power supply 510 is connected to the electrolytic capacitor voltage detecting circuit 512, the secondary relay controlling circuit 514, the primary relay controlling circuit 516, the AC input voltage detecting circuit 518, and a relay in the high-voltage protection circuit 502.

In an aforementioned embodiment, with a high grid voltage, a high distorted grid harmonic component, or a high environment temperature in energy saving, due to parallel impedance of the second capacitor C2, in rebound from energy saving, the voltage on the electrolytic capacitor may be big enough to establish the secondary power supply for successful wakeup and rebound. In addition, due to voltage-division and suppression by the first resistor R1 and the second resistor R2, high-voltage shielding may still be implemented in the circuit even with a high grid voltage in an energy saving mode, which is notably advantageous compared with circuit disconnection shielding.

With a second capacitor C2 connected across both ends of the primary relay, rapid rebound from an energy saving mode may be implemented effectively by adjusting capacitance of the first capacitor C1 and the second capacitor C2, thereby implementing efficient system energy saving and ensuring high-voltage protection in an energy saving mode.

An aforementioned power supply may further include a Micro Control Unit (MCU) controller, an optocoupler, and a secondary power supply controlling circuit. The MCU controller may be connected to the DC-DC conversion circuit. The optocoupler may be connected to the MCU controller. The secondary power supply controlling circuit may be connected between the secondary power supply and the optocoupler.

An aforementioned power supply may further include a cell. Outputs of the DC-DC conversion circuit may be connected in parallel to the cell. The cell may serve as a load of the power supply. The cell may be configured for powering the MCU controller.

The MCU controller may be configured for, when a rectifier in the rectifier circuit is in an energy saving mode, stopping the secondary power supply according to a Pulse Width Modulation (PWM) control signal for blocking the secondary power supply controlling circuit issued by the optocoupler.

Figure 6:
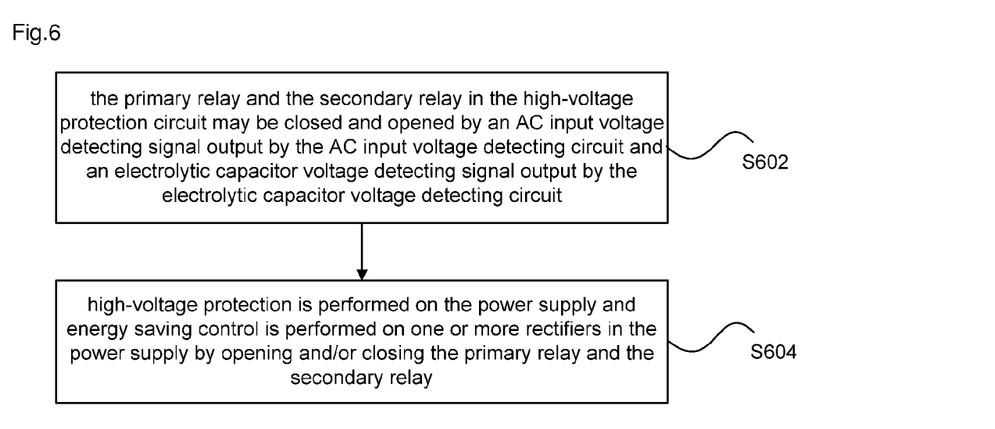
FIG. 6 is a flowchart of a high-voltage protection method according to an embodiment of the disclosure.

An embodiment of the disclosure may further provide a high-voltage protection method in using an aforementioned power supply. FIG. 6 is a flowchart of a high-voltage protection method according to an embodiment of the disclosure. As shown in FIG. 6, the method may include steps as follows.

In step S602, the primary relay and the secondary relay in the high-voltage protection circuit may be closed and opened by an AC input voltage detecting signal output by the AC input voltage detecting circuit and an electrolytic capacitor voltage detecting signal output by the electrolytic capacitor voltage detecting circuit.

In step S604, high-voltage protection is performed on the power supply and energy saving control is performed on one or more rectifiers in the power supply by opening and/or closing the primary relay and the secondary relay.

When the rectifier is in a non-energy-saving mode, the step S602 may include that: the AC input voltage detecting circuit may receive and process an AC input signal, and output the AC input voltage detecting signal to the primary relay controlling circuit; the electrolytic capacitor voltage detecting circuit may receive and process a voltage output signal of the electrolytic capacitor, and output the electrolytic capacitor voltage detecting signal to the primary relay controlling circuit and the secondary relay controlling circuit; the primary relay controlling circuit and the secondary relay controlling circuit may process the AC input voltage detecting signal and the electrolytic capacitor voltage detecting signal received, and generate a control signal for controlling the high-voltage protection circuit.

The primary relay controlling circuit and the secondary relay controlling circuit may process the AC input voltage detecting signal and the electrolytic capacitor voltage detecting signal received, and generate a control signal for controlling the high-voltage protection circuit as follows.

When normal voltages are detected according to both the AC input voltage detecting signal and the electrolytic capacitor voltage detecting signal, the primary relay controlling circuit may control the primary relay K1 to stay closed, and the secondary relay controlling circuit may control the secondary relay K2 to stay closed to implement normal power output via the primary relay K1. When an AC current overvoltage is detected, the primary relay controlling circuit may control the primary relay K1 to stay open, and the secondary relay controlling circuit may control the secondary relay K2 to stay open.

The step S604 may include that: high-voltage protection may be performed on the power supply by opening and/or closing the primary relay and the secondary relay, and energy saving control may be performed on one or more rectifiers in the power supply using the MCU controller.

It may be seen that in an embodiment of the disclosure, with a second capacitor C2 connected across both ends of the primary relay, by adjusting capacitance of the first capacitor C1 and the second capacitor, rapid rebound from an energy saving mode may be implemented effectively, ensuring high-voltage protection in an energy saving mode.

To clearly show a technical solution and an implementation mode of the present disclosure, the present disclosure is elaborated below with reference to embodiments.

Figure 7:
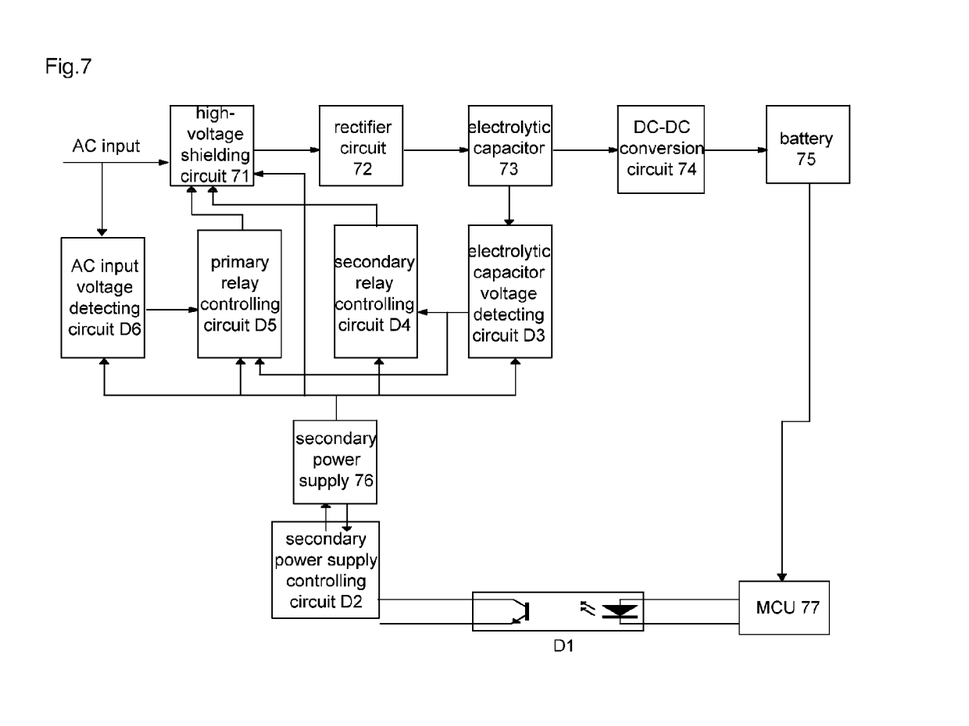
FIG. 7 is a schematic diagram of a structure of a power supply with an energy saving AC-input high-voltage protection device according to an embodiment of the disclosure.

FIG. 7 is a schematic diagram of a structure of a power supply with an energy saving AC-input high-voltage protection device according to an embodiment of the disclosure. As shown in FIG. 7, the power supply may include a high-voltage shielding primary circuit 71 serving as an aforementioned high-voltage protection circuit 502, a rectifier circuit 72 serving as an aforementioned rectifier circuit 504, an electrolytic capacitor 73 serving as an aforementioned electrolytic capacitor 506, a DC-DC converter 74 serving as an aforementioned DC-DC conversion circuit 508, a battery 75, a secondary power supply 76 serving as an aforementioned secondary power supply 510, an MCU controller 77, an isolating optocoupler D1, a secondary power supply controlling circuit D2, an electrolytic capacitor voltage detecting circuit D3 serving as an aforementioned electrolytic capacitor voltage detecting circuit 512, a secondary relay controlling circuit D4 serving as an aforementioned secondary relay controlling circuit 514, a primary relay controlling circuit D5 serving as an aforementioned primary relay controlling circuit 516, an AC input voltage detecting circuit D6 serving as an aforementioned AC input voltage detecting circuit 518.

In a non-energy-saving mode, the AC input voltage detecting circuit D6 may receive and process an AC input signal, and output the AC input voltage detecting signal to the primary relay controlling circuit D5; the electrolytic capacitor voltage detecting circuit D3 may receive and process a voltage output signal of the electrolytic capacitor 73, and output the electrolytic capacitor voltage detecting signal to the primary relay controlling circuit D5 and the secondary relay controlling circuit D4; and the controlling circuits D4 and D5 may process the AC input voltage detecting signal and the electrolytic capacitor voltage detecting signal input to generate a control signal for controlling the high-voltage shielding primary circuit to implement AC high-voltage and high-voltage shielding.

In an energy saving mode, the output of the DC-DC converter 74 may be connected to the battery, the battery may power the MCU controller 77, and the MCU controller 77 may automatically implement, according to a system load and a single-rectifier efficiency curve, energy saving control on one or more rectifiers to optimize system efficiency, as follows.

The MCU controller 77 may stop the secondary power supply 76 from operating, by taking away the drive thereof via a PWM control signal for blocking the secondary power supply controlling circuit D2 issued by the optocoupler D7. The output of the secondary power supply may be connected to the electrolytic capacitor voltage detecting circuit D3, the secondary relay controlling circuit D4, the primary relay controlling circuit D5, the AC input voltage detecting circuit D6, and a relay of the high-voltage shielding primary circuit. Thus, as the secondary power supply provides no power, a rectifier may stop operating, thereby implementing efficient system energy saving.

Figure 8:
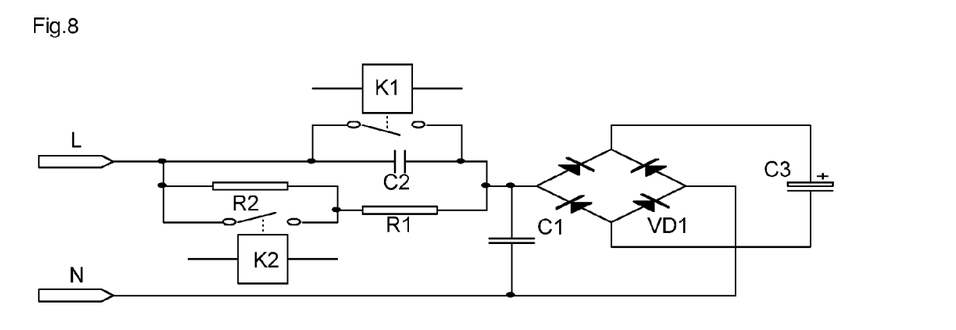
FIG. 8 is a schematic diagram of a high-voltage protection circuit according to an embodiment of the disclosure.

The high-voltage shielding primary circuit 71, as shown in FIG. 8, may include a live line and a neutral line parallel to the live line. A fixed-resistance resistor R1 and a thermistor R2 with a positive temperature coefficient may be connected in series between the output port and the input port of the live line. One end of the secondary relay K2 may be connected to the input port of the live line. The other end of the secondary relay K2 may be connected between R1 and R2. One contact of the primary relay K1 may be connected to the input port of the live line. The other contact of the primary relay K1 may be connected to the output port of the live line. Capacitor C2 may be connected in parallel with the primary relay K1 at both contacts thereof. That is, one end of capacitor C2 may be connected to the input port of the live line, and the other end of capacitor C2 may be connected to the output port of the live line. One end of capacitor C1 may be connected to the output port of the live line. The other end of capacitor C1 may be connected to the neutral line.

The primary relay controlling circuit D5 may close and open the primary relay K1. The secondary relay controlling circuit D4 may close and open the secondary relay K2.

When a rectifier is in a non-energy-saving mode, the AC input voltage detecting circuit D6 may keep monitoring and detecting an AC input voltage, the electrolytic capacitor voltage detecting circuit D3 may keep monitoring and detecting the electrolytic capacitor voltage. Such a detected voltage may be compared with a respective voltage threshold. When both detections show normal voltages, the primary relay controlling circuit D5 may keep the primary relay K1 stay closed, and the secondary relay controlling circuit D4 may keep the secondary relay K2 stay closed, implementing normal power output via the primary relay K1. When an AC current overvoltage is detected, the primary relay controlling circuit D5 may keep the primary relay K1 stay open, and the secondary relay controlling circuit D4 may keep the secondary relay K2 stay open, such that an AC input may enter the electrolytic capacitor 73 via the thermistor R2 with a positive temperature coefficient, the resistor R1 of a fixed resistance, and the rectifier circuit 72. As impedance of the thermistor R2 with a positive temperature coefficient increases with heat accumulation thereof, voltage-division on R2 suppresses any high voltage to be born on the electrolytic capacitor 73.

When a rectifier is in the energy saving mode, without C2, due to a high grid voltage, a high distorted grid harmonic component, or a high environment temperature, as thermistor R2 has a positive temperature coefficient, a high voltage is shared by the thermistor R2 and the R1 of a fixed resistance. Most part of the voltage is shared by R2, with only a very low voltage on the electrolytic capacitor C3 behind the rectifier bridge. In this case, if the MCU is to wake up a rectifier in the energy saving mode, due to too low a voltage on the electrolytic capacitor C3, the secondary power supply cannot rebound, leading to a wakeup failure.

In an embodiment herein, a C2 is added. With a high grid voltage, a high distorted grid harmonic component, or a high environment temperature in energy saving, due to parallel impedance of C2, in rebound from energy saving, the voltage on the electrolytic capacitor may be big enough to establish the secondary power supply for successful wakeup and rebound. Due to voltage-division and suppression by R1 and R2, high-voltage shielding may be implemented in an embodiment herein even with a high grid voltage in an energy saving mode, which is notably advantageous compared with circuit disconnection shielding.

Note that steps shown in a flowchart may be executed in a computer system with computer executable instructions, for example. In addition, in spite of a logic order shown in a flowchart, in some cases, the steps illustrated may be executed in an order different from that illustrated or described herein.

To sum up, with a high-voltage protection circuit, a high-voltage protection method, and a power supply according to embodiments of the disclosure, a second capacitor C2 is connected across both ends of the primary relay. With a high grid voltage, a high distorted grid harmonic component, or a high environment temperature in energy saving, due to parallel impedance of the second capacitor C2, rapid rebound from an energy saving mode may be implemented effectively by adjusting capacitance of the first capacitor C1 and the second capacitor C2, thereby implementing efficient system energy saving. In addition, due to voltage-division and suppression by the first resistor R1 and the second resistor R2, high-voltage protection in an energy saving mode may be ensured.

Apparently, those skilled in the art will know that modules or steps in embodiments of the disclosure may be realized using a universal computing device, and may be integrated in a single computing device or distributed in a network formed by multiple computing devices. Optionally, they may be realized using computing device executable program codes, and thus may be stored in a storage device and executed by a computing device. Or they each may be made into an Integrated Circuit module. Multiple modules or steps herein may be realized by being made into a single Integrated Circuit module. Thus, an embodiment of the disclosure is not limited to a specific combination of hardware and software.

What described are merely embodiments of the disclosure, and may not be used to limit the disclosure. Various modifications and variations can be devised by those skilled in the art without departing from the spirit and scope of the disclosure, and the disclosure is intended to cover such modifications, equipment replacements, and variations.

The invention claimed is:

1. A power supply, comprising a high-voltage protection circuit, a rectifier circuit, an electrolytic capacitor, a Direct Current (DC-DC) conversion circuit, a secondary power supply, an electrolytic capacitor voltage detecting circuit, a secondary relay controlling circuit, a primary relay controlling circuit, and an Alternating Current (AC) input voltage detecting circuit, wherein the high-voltage protection circuit is configured for performing high-voltage protection on the power supply; the high-voltage protection circuit comprises a primary relay, a secondary relay, a first resistor, a second resistor, a first capacitor, and a second capacitor, wherein one end of the primary relay is connected to an input port of a live line, the other end of the primary relay is connected to an output port of the live line; one end of the secondary relay is connected to the input port of the live line, the other end of the secondary relay is connected between the first resistor and the second resistor;

one end of the first capacitor is connected to the output port of the live line, the other end of the first capacitor is connected to a neutral line connected in parallel with the live line; the second capacitor is connected in parallel with the primary relay; and the second resistor and the first resistor are connected in series between the input port of the live line and the output port of the live line, the primary relay controlling circuit is configured for opening and closing the primary relay in the high-voltage protection circuit;

the secondary relay controlling circuit is configured for opening and closing the secondary relay in the high-voltage protection circuit;

the output end of the high-voltage protection circuit is connected to an input end of the rectifier circuit, the electrolytic capacitor is connected between an output end of the rectifier circuit and an input end of the DC-DC conversion circuit;

an output end of the secondary power supply is connected to a relay in the high-voltage protection circuit, the AC input voltage detecting circuit, the primary relay controlling circuit, the secondary relay controlling circuit, and the electrolytic capacitor voltage detecting circuit.

2. The power supply according to claim 1, wherein the first resistor has a fixed resistance, and the second resistor is a thermistor.

3. The power supply according to claim 1, wherein the high-voltage protection circuit further comprises a rectifier bridge and an electrolytic capacitor, wherein an input end of the rectifier bridge is connected to both ends of the first capacitor, and the electrolytic capacitor is connected to an output end of the rectifier bridge.

4. The power supply according to claim 1, further comprising a Micro Control Unit (MCU) controller, an optocoupler, and a secondary power supply controlling circuit, the MCU controller being connected to the DC-DC conversion circuit, the optocoupler being connected to the MCU controller, the secondary power supply controlling circuit being connected between the secondary power supply and the optocoupler.

5. The power supply according to claim 4, further comprising a cell, outputs of the DC-DC conversion circuit being connected in parallel to the cell, the cell serving as a load of the power supply and being configured for powering the MCU controller.

6. The power supply according to claim 4, wherein the MCU controller is configured for, when a rectifier in the rectifier circuit is in an energy saving mode, stopping the secondary power supply according to a Pulse Width Modulation (PWM) control signal for blocking the secondary power supply controlling circuit issued by the optocoupler.

7. A high-voltage protection method in using a power supply, the power supply comprising a high-voltage protection circuit, a rectifier circuit, an electrolytic capacitor, a Direct Current (DC-DC) conversion circuit, a secondary power supply, an electrolytic capacitor voltage detecting circuit, a secondary relay controlling circuit, a primary relay controlling circuit, and an Alternating Current (AC) input voltage detecting circuit; the high-voltage protection circuit comprising a primary relay, a secondary relay, a first resistor, a second resistor, a first capacitor, and a second capacitor; the method comprising:

closing and opening the primary relay and the secondary relay in the high-voltage protection circuit according to an AC input voltage detecting signal output by the AC input voltage detecting circuit and an electrolytic capacitor voltage detecting signal output by the electrolytic capacitor voltage detecting circuit; and performing high-voltage protection on the power supply and performing energy saving control on one or more rectifiers in the power supply by opening and/or closing the primary relay and the secondary relay, wherein one end of the primary relay is connected to an input port of a live line, the other end of the primary relay is connected to an output port of the live line; one end of the secondary relay is connected to the input port of the live line, the other end of the secondary relay is connected between the first resistor and the second resistor; one end of the first capacitor is connected to the output port of the live line, the other end of the first capacitor is connected to a neutral line connected in parallel with the live line; the second capacitor is connected in parallel with the primary relay; and the second resistor and the first resistor are connected in series between the input port of the live line and the output port of the live line, the high-voltage protection circuit is configured for performing high-voltage protection on the power supply;

the output end of the high-voltage protection circuit is connected to an input end of the rectifier circuit, the electrolytic capacitor is connected between an output end of the rectifier circuit and an input end of the DC-DC conversion circuit;

an output end of the secondary power supply is connected to a relay in the high-voltage protection circuit, the AC input voltage detecting circuit, the primary relay controlling circuit, the secondary relay controlling circuit, and the electrolytic capacitor voltage detecting circuit.

8. The high-voltage protection method according to claim 7, wherein the closing and opening the primary relay and the secondary relay in the high-voltage protection circuit according to an AC input voltage detecting signal output by the AC input voltage detecting circuit and an electrolytic capacitor voltage detecting signal output by the electrolytic capacitor voltage detecting circuit comprises: when the rectifier is in a non-energy-saving mode, receiving and processing, by the AC input voltage detecting circuit, an AC input signal, and outputting the AC input voltage detecting signal to the primary relay controlling circuit;

receiving and processing, by the electrolytic capacitor voltage detecting circuit, a voltage output signal of the electrolytic capacitor, and outputting the electrolytic capacitor voltage detecting signal to the primary relay controlling circuit and the secondary relay controlling circuit; and processing, by the primary relay controlling circuit and the secondary relay controlling circuit, the AC input voltage detecting signal and the electrolytic capacitor voltage detecting signal received, and generating a control signal for controlling the high-voltage protection circuit.

9. The high-voltage protection method according to claim 8, wherein the processing, by the primary relay controlling circuit and the secondary relay controlling circuit, the AC input voltage detecting signal and the electrolytic capacitor voltage detecting signal received, and generating a control signal for controlling the high-voltage protection circuit comprises:

when normal voltages are detected according to both the AC input voltage detecting signal and the electrolytic capacitor voltage detecting signal, controlling, by the primary relay controlling circuit, the primary relay to stay closed, controlling, by the secondary relay controlling circuit, the secondary relay to stay closed, and implementing normal power output via the primary relay;

when an AC current overvoltage is detected, controlling, by the primary relay controlling circuit, the primary relay to stay open, and controlling, by the secondary relay controlling circuit, the secondary relay to stay open.

10. The high-voltage protection method according to claim 7, wherein the performing high-voltage protection on the power supply and performing energy saving control on one or more rectifiers in the power supply by opening and/or closing the primary relay and the secondary relay comprises:

performing high-voltage protection on the power supply by opening and/or closing the primary relay and the secondary relay, and performing energy saving control on one or more rectifiers in the power supply using the MCU controller.

\* \* \* \* \*